United States Patent [19]
Liong et al.

[11] Patent Number: 5,784,548
[45] Date of Patent: Jul. 21, 1998

[54] MODULAR MIRRORED CACHE MEMORY BATTERY BACKUP SYSTEM

[75] Inventors: Thomas Singkiat Liong, San Jose; Ashwath Nagaraj; Krishnakumar Rao, both of Fremont, all of Calif.

[73] Assignee: Mylex Corporation, Fremont, Calif.

[21] Appl. No.: 613,080

[22] Filed: Mar. 8, 1996

[51] Int. Cl.⁶ .............................. G06F 13/00; G06F 12/00
[52] U.S. Cl. .................. 395/182.04; 395/405; 395/433; 395/182.12; 395/182.2
[58] Field of Search ................... 395/182.04, 182.05, 395/182.07, 182.02, 182.2, 182.21, 182.22, 405, 432, 433, 182.08, 182.12; 371/10.2

[56] References Cited

U.S. PATENT DOCUMENTS

| | | | |
|---|---|---|---|
| 4,313,180 | 1/1982 | Mochizuki et al. | 365/222 |
| 4,908,790 | 3/1990 | Little et al. | 364/900 |
| 4,977,537 | 12/1990 | Dias et al. | 364/900 |
| 5,204,963 | 4/1993 | Noya et al. | 395/750 |
| 5,276,619 | 1/1994 | Ohara et al. | 364/424.04 |
| 5,359,569 | 10/1994 | Fujita et al. | 365/229 |
| 5,437,022 | 7/1995 | Beardsley et al. | 395/575 |
| 5,438,549 | 8/1995 | Levy | 365/229 |
| 5,448,719 | 9/1995 | Schultz et al. | 395/182.03 |
| 5,519,831 | 5/1996 | Holzhammer | 395/182 |
| 5,544,347 | 8/1996 | Yanai et al. | 395/489 |
| 5,548,711 | 8/1996 | Brant et al. | 395/182 |
| 5,586,248 | 12/1996 | Alexander et al. | 395/182 |
| 5,586,291 | 12/1996 | Lasker et al. | 395/440 |
| 5,632,038 | 5/1997 | Fuller | 395/750 |

*Primary Examiner*—Robert W. Beausoliel, Jr.
*Assistant Examiner*—Norman M. Wright
*Attorney, Agent, or Firm*—Fish & Richardson P.C.

[57] ABSTRACT

A battery backup mirrored cache memory module for a cache dynamic random access memory (DRAM) system that senses the $V^{cc}$ level supplied through the cache controller to the cache memory and, if the cache controller supplied $V^{cc}$ falls below a preset threshold level, the battery backup apparatus switches the cache memory array to a backup battery $V^{cc}$ source, and a backup refresh control generator unit that is also powered by the backup battery $V^{cc}$ source. The cache DRAM, backup battery, and backup refresh generator are physically contained in a single module that can be disconnected from the cache controller and host computer system while preserving cache memory contents. The backup system is installed in an operating host system for recovery of the cache memory contents and/or resumption of execution of the program that was running when the $V^{cc}$ power failure occurred. Cache memory reliability is further enhanced by providing two cache memory banks that are accessed simultaneously using a common address and have a stored parity bit with each data entry. When a read access is made, a cache memory bank selector selects one of the bank's output data if no parity error is detected. If one bank has a parity error, the other bank's output can be used to correct the data in the bank with the parity error.

16 Claims, 7 Drawing Sheets

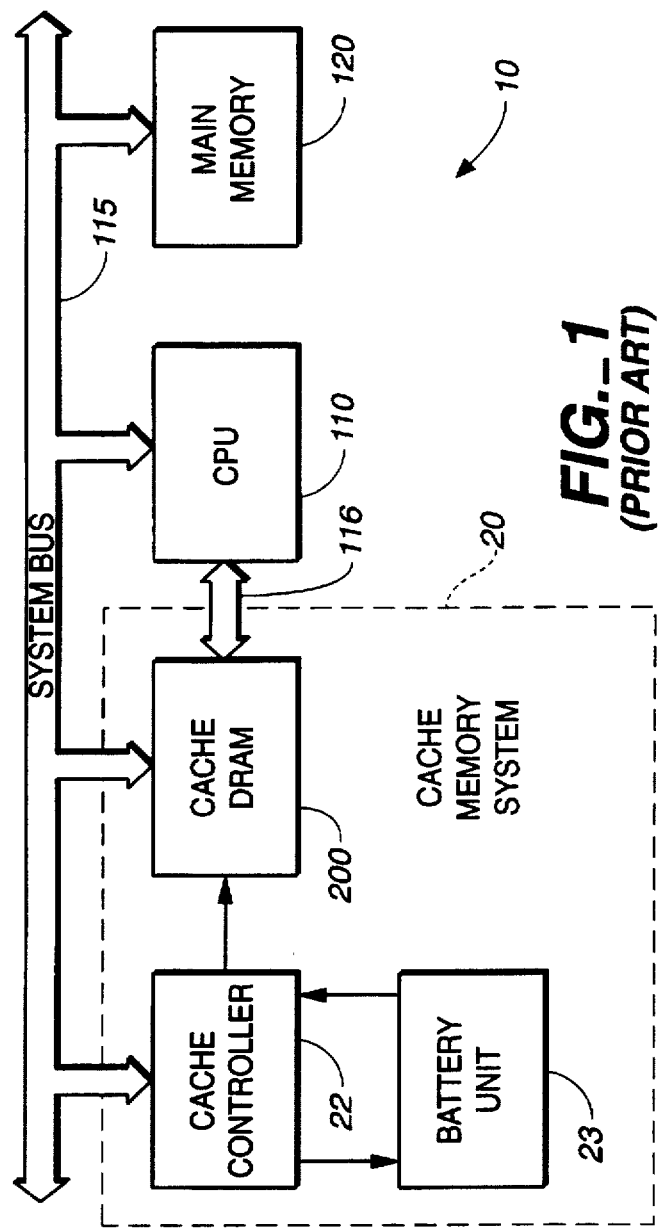
FIG._1
(PRIOR ART)

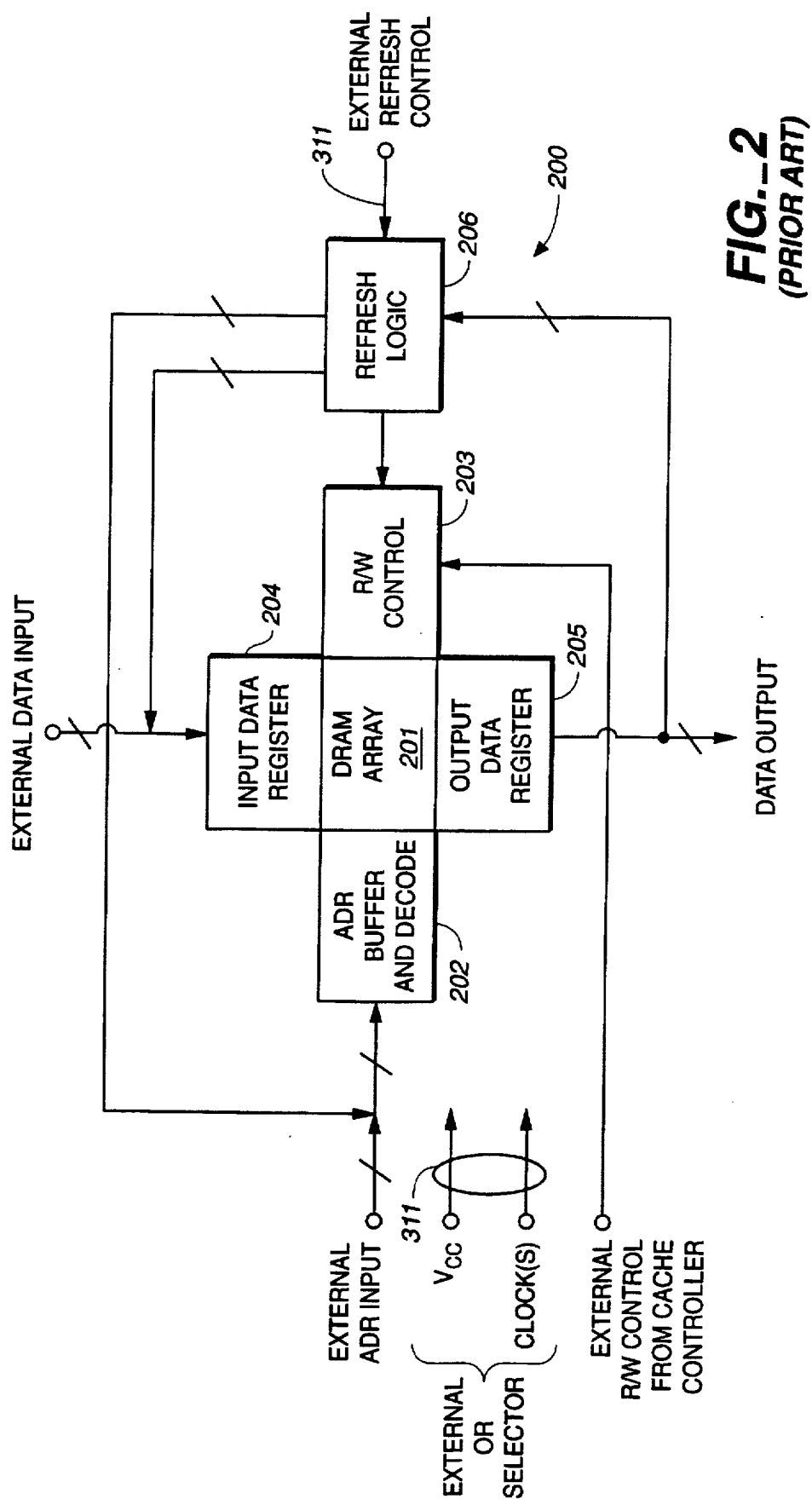
FIG._2 (PRIOR ART)

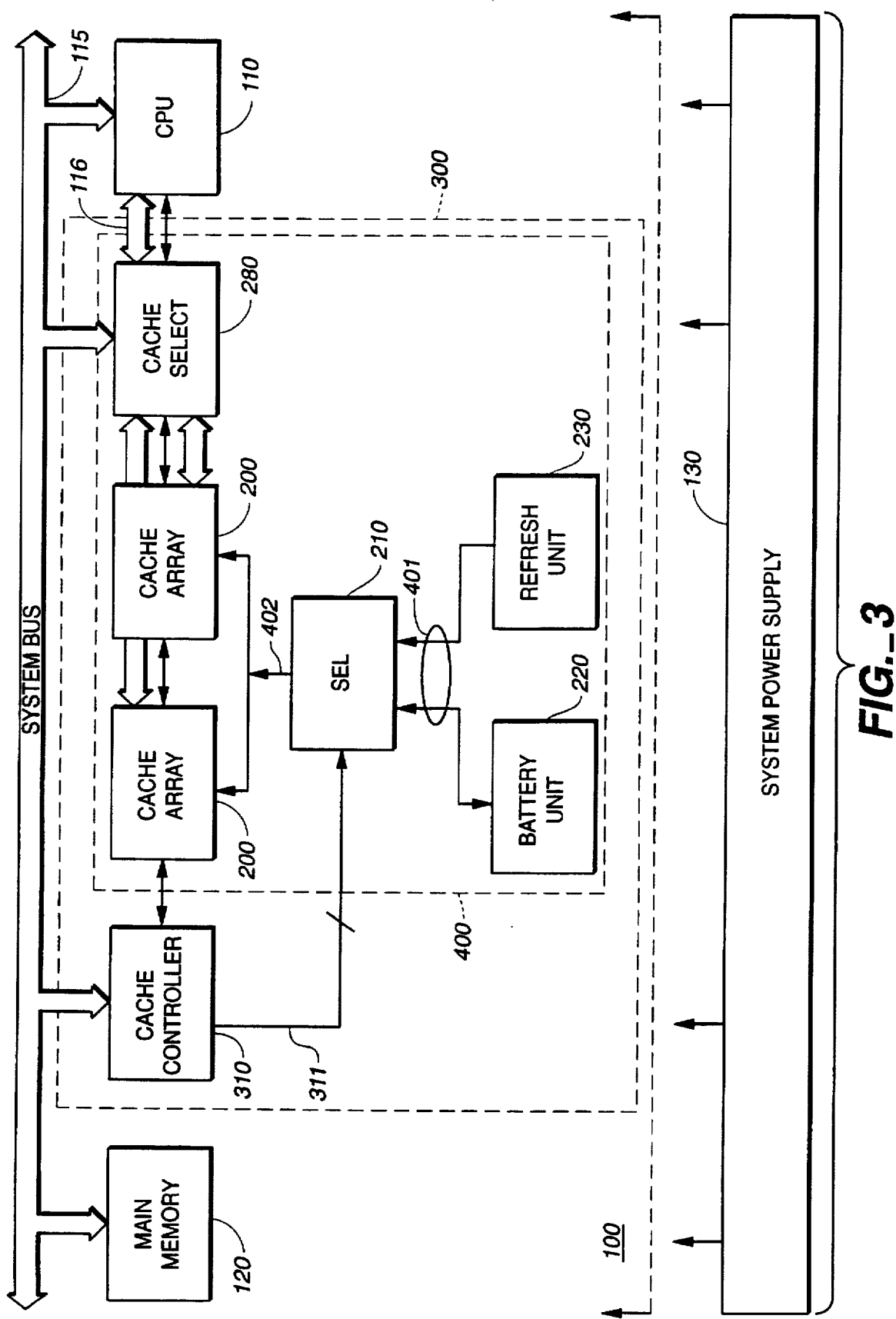
FIG._3

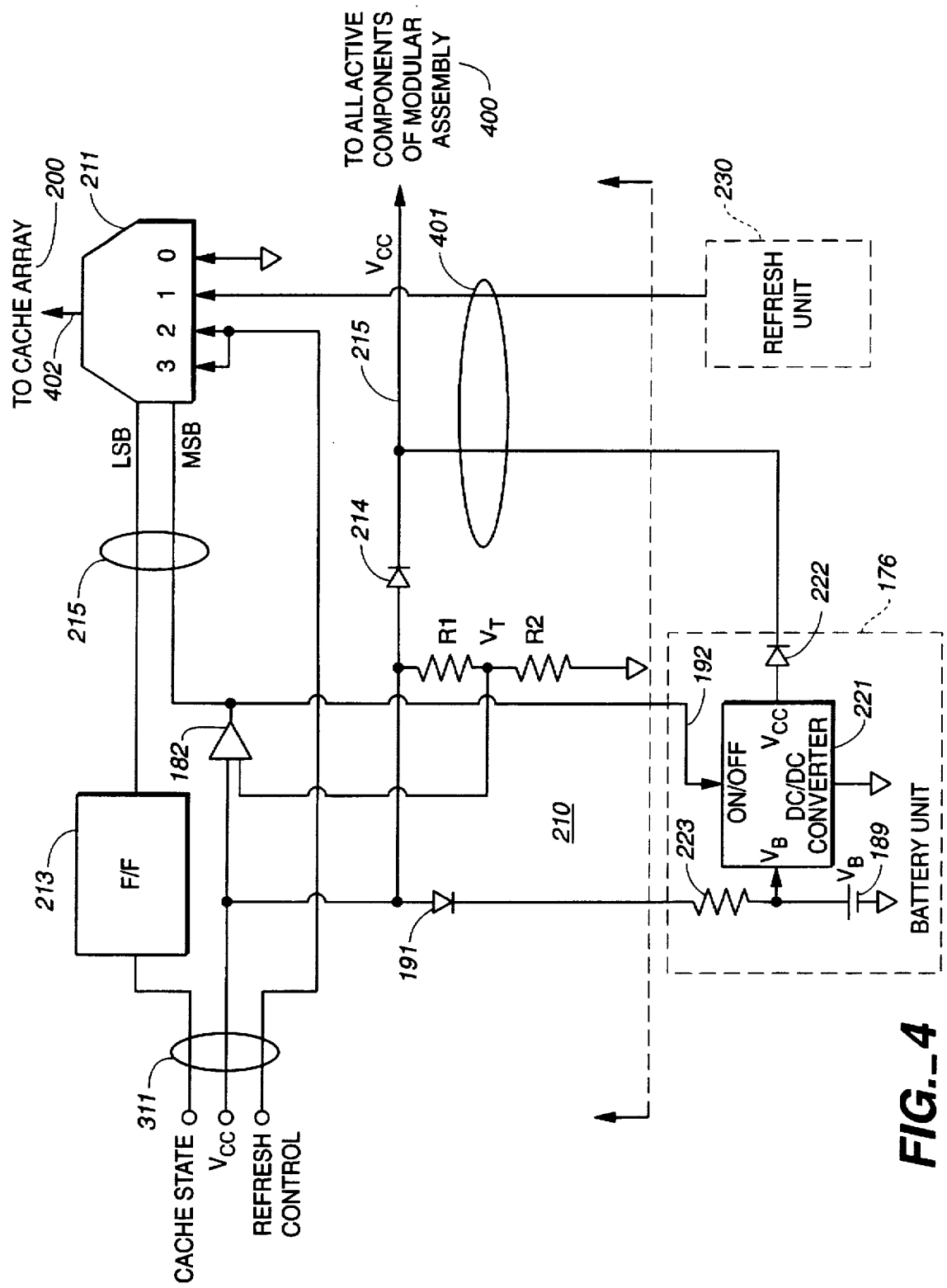
FIG._4

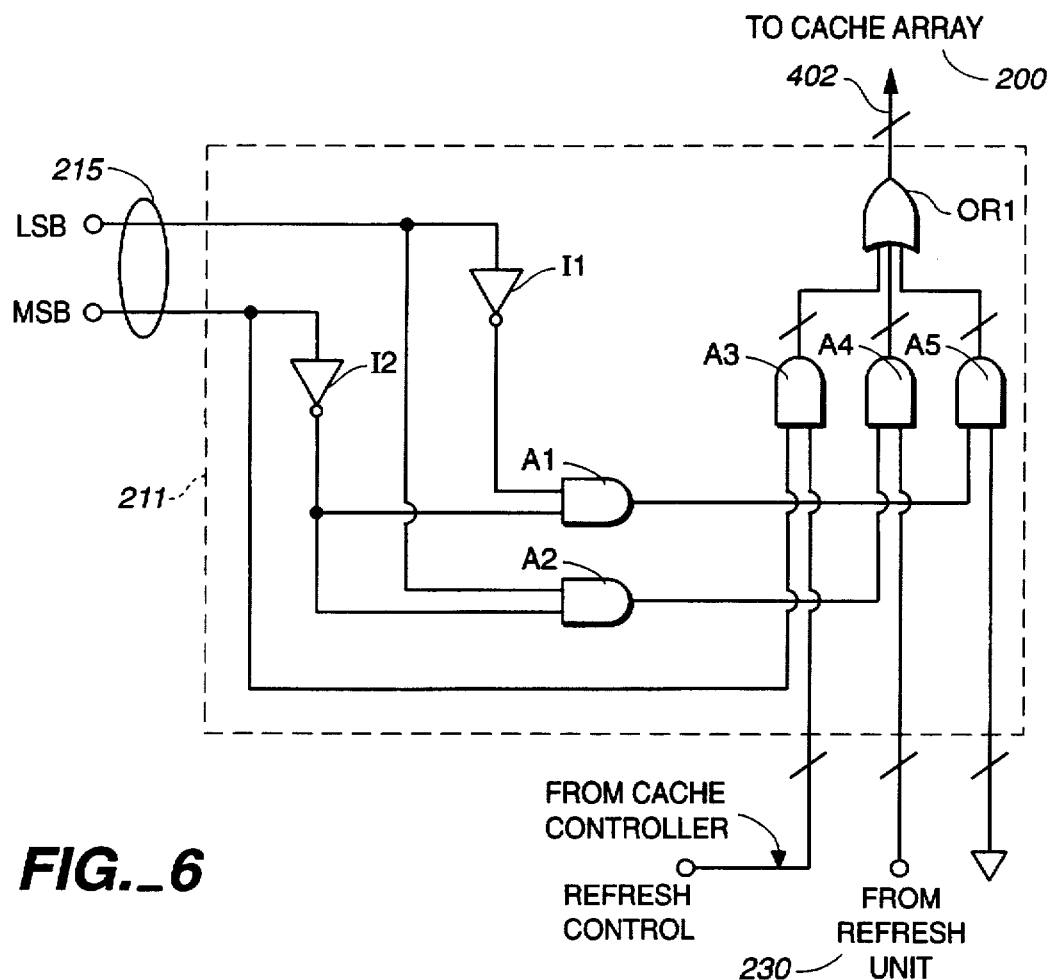
| INPUT CODE | | $V_{CC} > V_T$ | CACHE STATE | INPUT SET SELECTED | OUTPUT TO CACHE ARRAY 200 |
| --- | --- | --- | --- | --- | --- |
| MSB | LSB | | | | |
| 0 | 0 | NO | NOT DIRTY | 0 | LOW LOGIC |
| 0 | 1 | NO | DIRTY | 1 | REFRESH UNIT |
| 1 | 0 | YES | NOT DIRTY | 2,3 | CACHE CONTROLLER |
| 1 | 1 | YES | DIRTY | 2,3 | CACHE CONTROLLER |
FIG._5
FIG._6

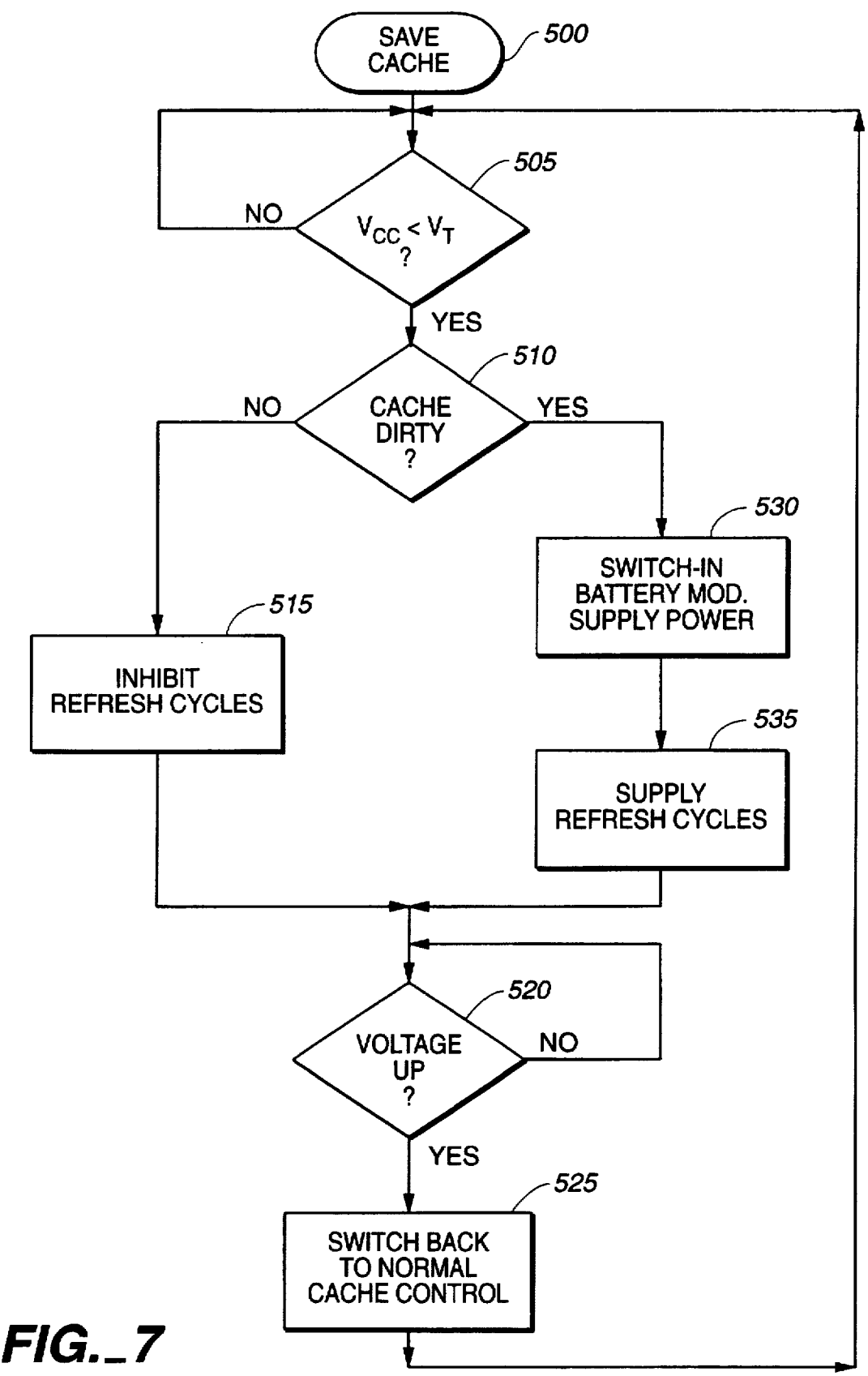
FIG._7

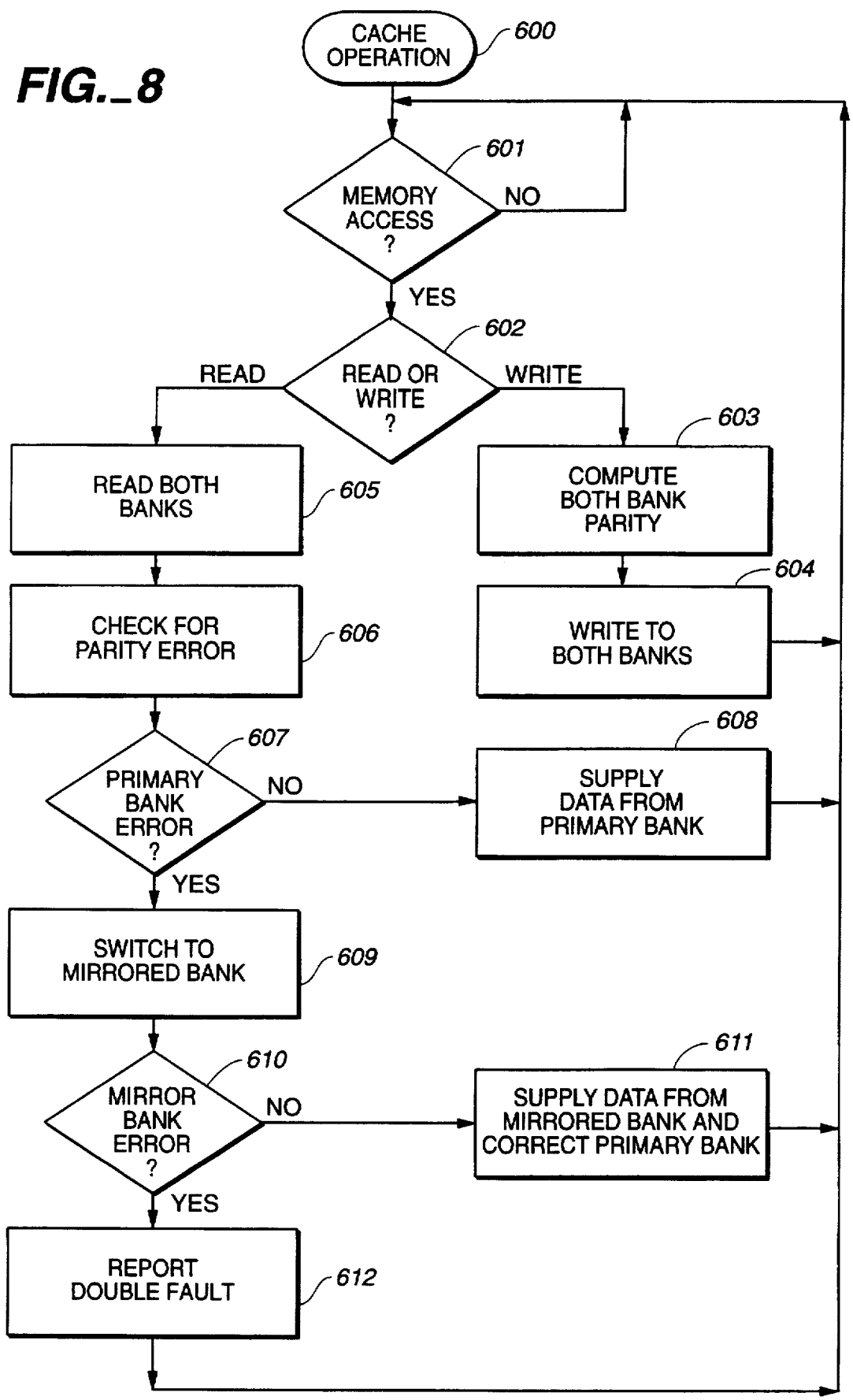
FIG._8

1

MODULAR MIRRORED CACHE MEMORY BATTERY BACKUP SYSTEM

CROSS REFERENCE TO RELATED APPLICATION

This application is related to a cofiled application entitledy "A Modular Cache Memory Battery Backup System" having common inventors and ownership.

FIELD OF THE INVENTION

The present invention relates to a system for storing and retrieving data in a computer cache dynamic random access memory (DRAM). More specifically, the invention is a high reliability cache memory system that includes a battery backup power supply, a battery operated DRAM refresh generator, a primary cache DRAM and a completely redundant secondary cache DRAM containing a copy (mirror image) of the primary cache memory contents for correcting read errors. The mirrored cache memory battery backup system is configured as a separable module with an integral battery power supply for providing the retention of data in a computer cache memory upon power loss or controller loss by using the battery backup supply.

BACKGROUND OF THE INVENTION

A computer memory cache is a fast memory in which frequently used data is stored for efficient use by the associated central processing unit (CPU). Cache memories were introduced to achieve a significant increase in the performance of the CPU at a very modest increase in cost. The cache memory (or simply "cache") is a high speed storage unit that is designed to operate with the CPU and the generally slower main memory unit. Because the cache is transparent to the program at the instructional level, it can be added to a computer system design without changing the instruction set and without modifying existing programs.

A cache memory can be used in a free-standing computer system for speeding-up CPU access to main memory (dedicated or shared), or used in conjunction with a host processor in an embedded computer system for speeding-up memory access. Also, main memory can be a collection of one or more storage devices using one or more storage technologies. However, for purposes of explaining the present invention, the free-standing computer system application will be used because the application of the present invention to other computer systems will become apparent to those practicing the art.

The use of a cache in a computer system is based upon two observations with respect to a referenced stored item: soon after being referenced, the referenced stored item will tend to be referenced again; and items stored near the referenced item will also tend to be referenced soon after. The cache provides efficient access to frequently used data by storing segments (lines or pages) of main memory in a fast memory local to the CPU.

When the CPU makes a request of memory, the CPU generates an address and searches the cache for the desired item. If the item is found in cache, a "hit" results and the item is applied to the CPU. If the item is not in cache, a "miss" results and the address is passed on to main memory. When a segment of main memory containing the referenced item is returned, a copy of the segment is stored in cache. If no cache storage space is available, the cache controller typically provides the necessary space by replacing the least recently used (LRU) segment with the latest referenced segment.

A common form of cache memory is based on MOS (metal oxide semiconductor) technology in which binary data is efficiently stored as a charge on a MOS transistor gate. This form of memory cell has low power dissipation and conserves chip area relative to bistable flip-flop memory cells. For an N-channel (NMOS) device, a sufficiently small positive charge capacitively stored on the gate will turn the device on while removing the charge will turn the device off (non-conducting). The on state may be interpreted as either a logic 1 or 0. These cells, either NMOS or PMOS, are charge storage capacitors with driver transistors. The memory also requires means for sensing the presence or absence of a charge and for placing or removing the charge from the gate.

The disadvantage to the use of these MOS memory cells is that the capacitively stored charge eventually leaks off and causes the stored data to be lost. In addition, the read process is destructive because a stored charge is discharged when the state is read. Because of the leakage and because of the destructive read characteristic, means are provided for restoring the prior state of the cell after reading. Thus, by periodically reading the contents of memory and restoring the data, a "refresh" mode is established that can preserve stored data indefinitely unless a failure of the refresh mode or the power supply occurs. This refresh mode gives rise to the term "dynamic" memory cell. Despite this disadvantage, dynamic random access memories (DRAMs) formed from an array of dynamic memory cells have found widespread use because of the high bit packing densities that can be achieved on a chip.

Because solid state random access memories (RAMs) are volatile, i.e. they lose their memory when the power is turned off, it is common prior art practice to provide a battery backup power supply for the cache memory controller which in turn provides power from the cache memory controller to the cache memory cell array. This precaution allows the memory to function and retain its memory during a power outage.

FIG. 1 shows an example of a prior art computer system 10 that includes a cache memory system 20. Data and control signals are distributed through system 10 by system bus 115 which interconnects cache memory system 20, CPU 110, and main memory 120. Cache memory system 20 includes cache DRAM 200 for storing data, cache controller 22 for controlling the operating modes of cache DRAM 200 (such as read/write to cache and to main memory, and refresh of cache DRAM 200), and battery backup unit 23 to provide power to cache controller 22 and cache DRAM 200. An additional data and control path 116 may be provided for allowing CPU 110 a direct communication channel with cache memory system 20.

FIG. 2 shows the basic architecture of a cache DRAM 200 suitable for use in the cache memory system 20 of FIG. 1. The cache DRAM is organized around the storage element, DRAM array 201. A set of interfaces are provided: address buffer register and address decode 202 for decoding input data addresses, read/write (r/w) control 205 for selecting a read or write operating mode, input data register 204 for receiving write data, and output data register 205 for outputting read data. In addition, a refresh logic and address counter 206 is used to periodically refresh the contents of DRAM array 201 by reading, and then writing back into the same address, the contents of DRAM array 201 by using an internal address counter to generate all of the addresses in DRAM array 201. The refresh logic control is provided by cache controller 22 (FIG. 1) on input lines 311. Input lines 311 also carry the power required ($V_{cc}$) by cache memory system 20 (FIG. 1). Power to cache DRAM 200 is provided through cache controller 22 (FIG. 1).

Referring again to FIG. 1, in the case of power ($V_{cc}$) failure to cache controller unit 22 of FIG. 1, battery unit 23 is switched in by cache controller 22 for keeping both the cache controller and cache DRAM functioning. However, prior art backup methods, such as described and shown in FIG. 1, do not provide cache memory protection in the case of a cache controller failure because the refresh function and the backup battery switching action is controlled by and through controller 22.

Therefore, there is a need for a cache memory system that is capable of saving cached data in the event of either a general power failure or a controller failure by providing battery backup power directly to the memory array and by providing for the DRAM refresh function on a separate assembly so that the DRAM continues to retain its memory until the faulty controller is replaced or the DRAM memory array with backup can be transferred to a system with a working cache controller.

Also, if a read error should occur in a prior art cache memory, the presence of a read error can be detected by means of a parity bit for each line of cache memory. However, the presence of a parity bit only allows detection of an odd number (1, 3, ...) of bit errors and does not provide for error correction. Thus, a cache memory read error, if detected, would require that the erroneous data be replaced either by accessing main memory or by accessing main memory and recomputing any intermediate results that may have been generated by the associated CPU. The reconstruction of the erroneous data is time consuming and hence reduces the computer system throughput.

In order to increase the overall reliability by providing protection against power failure, cache controller failure, and cache memory read errors, the present invention provides for a battery backup cache memory system configured as a detachable cache module with an integral battery power supply and refresh logic circuit, and a dual cache memory array for storing the cache data in one array and its mirror image in the other, each array having independent parity for error detection.

SUMMARY OF THE INVENTION

Briefly, the invention consists of a battery backup mirrored cache memory modular assembly for use in a computer system for providing a cache DRAM battery backup system that is physically separable from the associated cache memory controller. The modular assembly is normally powered by a system power supply. A refresh control signal normally provided by an external source generates a set of refresh signals for refreshing the cache memory. The modular assembly includes:

(1) a first and a second cache DRAM, each for caching the same data for an associated CPU, each having a parity bit for each line in memory, a parity checker for computing the parity bit for each access and detecting a read error by computing a parity bit for each accessed line and comparing the computed parity bit with the stored parity bit of the accessed line, and each DRAM simultaneously addressable using a common address;

(2) a selector for selecting a read request output from one of the two cache DRAMs, the selected cache DRAM having a correct parity bit; and (3) a battery backup system having a battery power source for operating the two cache DRAMs, a refresh generator powered by the battery power source, and a controller for selecting between the system power supply and the battery power source for providing power to the modular assembly when the system power falls below a predetermined level, and for connecting the refresh generator to the cache memory arrays, by monitoring the system power supply output level.

The modular assembly can be physically disconnected from the host computer system for the life of the battery power source without losing the cache memory contents.

BRIEF DESCRIPTION OF THE DRAWING

The present invention will be more fully understood from the detailed description given below and from the accompanying drawings of the preferred embodiments of the invention, which, however should not be taken to limit the invention to the specific embodiment but are for explanation and better understanding only.

FIG. 1 is a block diagram of a typical prior art computer system with a cache memory system that includes a cache controller, a cache DRAM, and a battery backup unit.

FIG. 2 is a block diagram of a prior art cache DRAM including refresh control.

FIG. 3 is a block diagram of a computer system using the mirrored cache memory battery backup module.

FIG. 4 shows a controller for detecting power failure and for operating the mirrored cache memory battery backup module.

FIG. 5 is a logic table used in the operation of the preferred embodiment of the mirrored cache memory battery backup module.

FIG. 6 is a logic diagram for the alternative selector (MUX) shown in FIG. 4.

FIG. 7 is a flow diagram showing the method of operating the cache memory backup module.

FIG. 8 is a flow diagram showing the method of operating the mirrored cache.

DESCRIPTION OF THE PREFERRED EMBODIMENTS

FIG. 3 is a block diagram of a computer system 100 that includes a cache memory system 300 with a modular assembly backup system 400 that overcomes the limitations of prior art backup systems.

FIG. 3 shows a computer system which includes CPU 110, main memory 120, and cache memory system 300 as computer system elements that are interconnected by system bus 115. Alternate communication path 116 between cache memory system 300 and CPU 110 provides a direct path between cache memory and CPU and thus reduces the traffic on system bus 115. System power supply 130 provides operating power to all active elements of the computer system.

Cache memory system 300 includes cache controller 310 and modular assembly backup system 400. Modular backup system 400 includes dual cache arrays 200 in place of the prior art single cache DRAM shown in FIG. 1, backup controller and selector (SEL) 210, battery backup unit 220, and refresh unit 230. Backup controller and selector 210 monitors the state of the power ($V_{cc}$) supplied by cache controller 310 on lines 311. Lines 311 also carry the necessary refresh control signals required by the refresh logic and address counter 206 shown in cache DRAM array 200 in FIG. 2. The outputs of battery unit 220 and refresh unit 230 is connected to backup controller and selector 210 by lines 401 that carry the backup power ($V_{cc}$) from battery unit 220 needed to operate cache arrays 200 and the output refresh control signals from refresh unit 230. Output lines 402 provide the refresh control signals selected by backup controller and selector 210 for operating the refresh logic and address counter of both cache DRAMs 200. Output lines 402 from controller and selector 210 provides the power needed to operate refresh logic 206 of FIG. 2.

Battery unit 220 is a standby $V_{cc}$ source for supplying power to all active components of modular backup system 400 through controller and selector 180.

Refresh unit 230 in FIG. 3 generates a set of control signals matched to the requirements of the refresh logic 206 shown in FIG. 2. Because refresh logic 206 includes an address counter, only a system clock is required to drive refresh logic 206. For example, cache DRAM 200 can be implemented by using an Intel 21256 DRAM that provides an on-chip refresh control and address counter that only requires that a two phase clock (RAS and CAS) be supplied by cache controller 310 (FIG. 3) for operating the chip.

FIG. 4 is a detailed circuit block diagram of the controller and selector 210 of FIG. 3. Referring to both FIGS. 3 and 4, the normal input from cache controller 310 is provided on input lines 311 that supply $V_{cc}$ for distribution to all active components in modular backup system 400, refresh control signals for driving the refresh control logic of cache array 200, and a cache state line for indicating if the cache data is "dirty" i.e. not exclusively owned and modified.

The $V_{cc}$ supplied through lines 311 is applied to diode 214 which is connected as shown so that current flows into diode 214 from the cache controller. The output from the diode is connected to line 215 for distribution of power throughout the modular backup assembly. (Details of the distribution of power are well known in the art and are therefore omitted in order to more clearly describe the invention.) Line 215 is also connected to the $V_{cc}$ output of battery unit 220 through isolation diode 222 for supplying backup power to the modular backup assembly. The $V_{cc}$ supplied from the cache controller by input lines 311 provides a trickle charge to battery 189 through isolation diode 191 and resistor 223. Input 311 also supplies the necessary current required by the active circuits of the modular backup assembly. If the cache controller supplied $V_{cc}$ should drop below the $V_{cc}$ level supplied by battery unit 220, diode 222 is backward biased and isolates (disconnects) the cache controller $V_{cc}$ source from battery unit 220, and diode 222 in battery unit 220 is forward biased for providing a low resistance path for the battery supplied current. Conversely, if the power level supplied by the cache controller returns to normal after having dropped, the cache controller-supplied $V_{cc}$ is restored. In this manner, a smooth transition between the primary cache controller-supplied power and the backup battery power is achieved.

The $V_{cc}$ line from input 311 is also applied to an input of voltage comparator 182 and the reference input is connected to the threshold voltage ($T_T$) output of voltage divider R1, R2. The threshold voltage is pre-fixed at the lowest acceptable level for $V_{cc}$ so that if $V_{cc}$ falls below that level, the output from comparator 182 is at the logic low level. Otherwise, voltage comparator 182 output is at the logic high state.

The cache state line of input 311 carries a binary signal indicating if the cache is dirty, and is stored in flip-flop 213. The output state of flip-flop 213, together with the output of comparator 212, forms a 2-bit binary selector code on lines 215, applied to the select input of MUX 211. When the cache state is dirty, the output of flip-flop 213 is at the high logic level; otherwise, it is at the low logic level.

MUX 211 has four sets of inputs labeled 0–3 and one output set of lines 402 for delivering the refresh control signals to cache array 200. The particular set of inputs selected is determined by the state of the 2-bit select code as shown in the first two columns of the logic table of FIG. 5. Referring to FIGS. 4 and 5, the output from comparator 212 is labeled "msb" (most significant bit) while the output of flip/flop 213 is labeled "lsb" (least significant bit). The second and third columns give the physical meaning: the msb is low when the cache controller supplied $V_{cc}$ is greater than the threshold voltage, $T_T$, input to comparator 182, and high otherwise. The lsb low state indicates that the cache is not dirty, while the high state means that the cache contents are dirty. The fifth and sixth columns indicate which set of input lines are selected for outputting. Thus, for msb/lsb input (0,0), no refresh control signal is supplied because the cache data is not modified and hence can be restored from main memory. For input (0,1), refresh unit 230 output refresh control signal set is selected. Whenever msb=1 (high), the cache controller 310 supplies $V_{cc}$, the refresh control signal set, and also deactivates DC/DC converter 221 by means of control line 192 that is connected to the on/off control.

Referring back to FIG. 4, battery unit 220 includes a battery power source 224 which is a single cell nickel-cadmium (nicad) battery that produces an output voltage, $V_B$, of approximately 2.4 volts. Battery 224 provides the power required to drive DC to DC voltage converter 221 for producing a backup output voltage, $V_{cc}$. A typical value of $V_{cc}$ for operating the DRAM array is 5.0±0.5 volts. Thus, DC/DC converter 221 supplies the backup power through diode 222 when the $V_{cc}$ level supplied by cache controller 310 on input line 161 drops below the $V_{cc}$ voltage level supplied by DC/DC converter 221. Thus, the nominal $V_{cc}$ output level from DC/DC converter 221 should be set lower than the nominal $V_{cc}$ level supplied on input lines 311.

FIG. 6 is a logic diagram showing an alternative implementation of MUX 211 that includes lsb and msb input lines 215, inverters I1 and I2, two input AND-gates A1 and A2, and a set of and gates A3, A4, and A5 for selecting one set of input lines: either cache controller refresh lines, refresh unit 230 refresh lines, or low logic level lines to prevent supplying a set of refresh control signals when the cache controller-supplied $V_{cc}$ is below threshold voltage, $T_T$, and the cache contents are not dirty. The latter choice is an option that allows the cache memory contents to be lost because the non-dirty state means that the cache contents have not been modified and hence are recoverable from main memory. If this option is not exercised, the selector (MUX) 211 implementation can be further simplified by eliminating the logic components associated with selecting the set of low logic level lines (I1, A1, and A5). OR-gate OR1 selects the active set of lines from either A3, A4, or A5 for outputting on output lines 402.

FIG. 7 is a flow diagram that summarizes the method (SAVE CACHE 500) by which the cache memory backup apparatus of FIG. 4 functions. Step 505 checks if the cache controller supplied $V_{cc}$ is less than the threshold voltage, $T_T$, and if so proceeds to step 510. Otherwise, the cache continues to operate until $V_{cc}<T_T$. Step 510 checks if the cache is in a dirty state and, if so, the backup battery is switched-in at step 530 to supply the cache backup module with $V_{cc}$ and proceeds to step 535 where the required refresh control signals to preserve the cache contents are supplied to the cache array by the refresh signal generation unit. If the cache is not dirty, step 515 inhibits the refresh control signals by not supplying the cache DRAM with the required refresh control signals, or by not supplying backup $V_{cc}$ power to the cache array. Step 520 monitors the cache controller-supplied $V_{cc}$ for the return of normal power in step 525 and when restored, power and refresh control signals are again provided by the cache controller. The method returns to step 505 to await another $V_{cc}$ failure.

Referring to FIG. 3, cache memory backup module 400 also includes a pair of "mirrored" DRAM cache arrays 200 operating in parallel under control of cache controller 310 under normal operating conditions as described above. Access to main memory 120 is provided by system bus 115. Primary access to both cache arrays 200 by CPU 110 is provided by cache bus 116 through cache selector 280. When data from system bus 115, or from CPU 110 over bus 116, is written to cache memory system 300, a parity bit is generated and, together with the data, is stored in each cache array 200 at the same address through cache selector 230. When data is read from cache memory, both cache arrays 200 are read simultaneously using the same address and the results are presented to cache selector 230 which checks the parity of the data from each cache array with the associated stored parity bit. If both cache array output data shows the correct parity, the output data of one of the pair of cache arrays 200 is selected for outputting by cache selector 280. If only one cache array output data has correct parity, that output is selected by cache selector 280 for outputting. If neither cache array parity is correct, a system error flag is set. Cache controller 310 selects whether the output of cache select 280 goes to bus 116, or system bus 115, based on whether the read access is a read request from CPU or a write-back request to main memory 120. The simplest method of selecting which cache array 200 output is to be used when both parity checks are correct is by designating one of the cache arrays as the primary cache array from which data is selected when no parity error is detected. Alternatively, the selection could be by rotation or by randomly selecting one of the pair of cache arrays.

If a single parity error is detected, cache controller 310 causes the output data of the cache array with correct parity to be written into the other cache array at the same address that was used to access the original data. In this manner, the paired (mirrored) cache arrays provide increased reliability maintaining the integrity of the cache memory.

FIG. 8 is a flow diagram of the method (Mirrored Cache Operation 600) described above for using the mirrored cache memory system 300 of FIG. 3 to correct for parity errors. The method begins at step 601 where the method awaits a cache system memory access. When an access is initiated, step 602 determines if it is a read or write access request. If it is a write request, the method goes to step 503 where a parity bit is computed from the data by exclusive-oring the data bits. In step 604, the parity bit is stored together with the data at the designated address in both cache arrays (banks) and the method returns to step 601. If the access is determined to be a read request in step 602, step 605 reads both cache banks. Step 606 checks the output of each bank for a parity error by computing the parity of each bank's output data and comparing the computed parity with the stored parity bit that was computed when the data was originally stored. If no parity error is detected for either bank's output, step 607 moves the process to step 608 where data for outputting is selected from the bank that has designated as the primary bank and the method returns to step 501. Otherwise step 604 moves the process to step 609 where the output of the other (mirrored) bank is selected. At step 609, the output data from the mirrored bank is checked for a parity error. If the computed parity for the mirrored bank data is correct, the process, at step 610, moves to step 611. Step 611 outputs the mirrored bank output data, corrects the primary bank by copying the outputted data from the mirrored bank, and returns to step 601. Otherwise, step 612 reports a double parity error fault and then returns to step 601. The host operating system can decide how to handle the double parity data error, depending on the state of the cached data (owned, shared, dirty, etc.).

It should be noted that an important optional feature of the backup system is the physically separable module 400 of FIG. 3. By being physically separable from the cache controller and the host computer system, battery backup module 400 can be removed from the failed physical environment and "plugged" into another system with an operating cache controller. This allows the contents of cache to be accessed by the new host system for updating main memory and/or resuming execution of the program during which the cache controller failure occurred. An industry standard single in-line memory module (SIMM) type physical configuration is suitable.

As will be understood by those skilled in the art, many changes in the methods and apparatus described above may be made by the skilled practitioner without departing from the spirit and scope of the invention, which should be limited only as set forward in the claims which follow.

What is claimed is:

1. A mirrored cache memory system including modular battery backup for use in a computer system, the mirrored cache memory system controlled by a computer system cache controller that normally provides refresh signals for the mirrored cache memory system and powered by a computer system power supply, the modular battery backup for providing power and refresh signals to the mirrored cache memory system if the computer system cache controller should fail, the cache memory system comprising:

(a) a mirrored cache memory that includes a first and a second DRAM bank addressable by a common address for storing a copy of stored data in each DRAM bank, and for providing a redundant backup memory for read error correction, each DRAM bank having a refresh input for accepting a set of refresh signals, and a bank selector controlled by the computer system cache controller for selecting data access to and from the first and second DRAM bank;

(b) a battery power source;

(c) a refresh generator for generating a set of refresh signals for refreshing the mirrored cache memory; and (d) a backup system controller for sensing a computer system cache controller failure, disabling the computer system power supply from supplying power to the mirrored cache memory and, otherwise, enabling the battery source to provide power to the mirrored cache memory, the battery backup system controller also disconnecting refresh signals supplied by the cache controller to the first and second DRAM bank refresh signal input when the computer system cache controller fails, and connecting the set of refresh signals from the refresh generator to the first and second DRAM bank refresh signal input.

2. The mirrored cache memory system of claim 1 wherein the first and the second DRAM bank each include refresh logic for refreshing each DRAM bank.

3. The mirrored cache memory system of claim 1 wherein a write parity bit is stored for each data write access, a bank selector computes a read parity bit from the output data of the first and from output data of the second DRAM bank in response to a read access and compares the read parity bit with the write parity bit stored with the accessed data for determining a parity error when the read parity bit and the write parity bit do not match, and, for outputting data, and selecting a DRAM bank whose read parity bit matches the stored write parity bit.

4. The mirrored cache memory system of claim 3 wherein a DRAM bank parity error is corrected, when only one of the DRAM banks produces a parity error, by writing the output data and parity bit from the DRAM bank without a parity error to the other DRAM bank.

5. The mirrored cache memory system of claim 3 wherein a cache memory fault flag is generated by the cache selector when both DRAM banks produce a parity error.

6. A modular battery backed cache memory system including a mirrored cache dynamic random access memory (DRAM) for use in a computer system, the modular battery backed cache memory system controlled by an external cache controller and receiving refresh signals and operating power from the computer system the modular battery backed cache memory system configured as an integrated module comprising:

(a) a mirrored cache DRAM comprising a first and a second cache DRAM, each cache DRAM comprising an array of dynamic memory cells and refresh circuitry with a refresh input for accepting a set of refresh control signals for refreshing the cache DRAM contents;

(b) a battery power source for providing power for operating the cache memory;

(c) a refresh generator for generating a set of refresh control signals for refreshing the mirrored cache DRAM when the modular battery backed cache memory system is disconnected from the computer system and external cache controller thereby preserving the contents of the mirrored cache DRAM; and (d) a backup system controller for selecting the system power supply for supplying power to the cache DRAM when the system power supply is operating at a proper output voltage level, and for selecting the battery power source output otherwise, the backup system controller also for connecting the first and the second refresh input to a cache controller refresh control signal output when the system power supply is supplying a specified output voltage level, and for connecting the first and the second cache DRAM refresh input to the set of refresh control signals when the system power supply is not supplying the specified output voltage level.

7. The modular battery backed cache memory system of claim 6 further comprising a trickle charge circuit for charging the battery power source from a computer system power supply.

8. The modular battery backed cache memory system of claim 6 further comprising:

(a) an input for accepting a cache status signal from the cache controller that indicates if each cache DRAM contents are dirty; and (b) inhibiting the refresh generator from applying a set of refresh signals to each cache DRAM when the cache status signal indicates that each cache DRAM contents are not dirty and when the system power supply is not supplying the specified output voltage level.

9. The modular battery backed cache memory system of claim 6 wherein the module is a single in-line memory module (SIMM).

10. The modular battery backed cache memory system of claim 6 wherein the first and the second DRAM bank includes refresh logic for refreshing both DRAM banks.

11. The modular battery backed cache memory system of claim 6 wherein a write parity bit is stored for each data write access, a bank selector computes a read parity bit from output data of the first and from the output data of the second DRAM bank in response to a read access and compares the read parity bit with the write parity bit stored with the accessed data for determining a parity error when the read parity bit and the write parity bit do not match, and, for outputting data, and selecting a DRAM bank whose read parity bit matches the stored write parity bit.

12. The modular battery backed cache memory system of claim 11 wherein a DRAM bank parity error is corrected, when only one of the DRAM banks produces a parity error, by writing the output data and parity bit from the DRAM bank without a parity error to the other DRAM bank.

13. The modular battery backed cache memory system of claim 11 wherein a cache memory fault flag is generated by the cache selector when both DRAM banks produce a parity error.

14. A cache memory system for use in a computer system, the cache memory system controlled by an external cache controller and receiving refresh signals and operating power from the computer system, the cache memory system comprising:

an integrated module removable from the computer system and operating to sustain contents of the cache memory system without the intervention of the external cache controller and computer system, the integrated module including;

(a) a mirrored cache memory including a first and second bank of commonly addressable dynamic random access memory (DRAM) for storing a copy of all data stored in the cache memory system, each bank having a refresh input for accepting a set of refresh signals;

(b) a battery power source;

(c) a refresh generator for generating a set of refresh signals for refreshing the first and second DRAM banks; and (d) a backup system controller for sensing an external cache controller failure, enabling the battery power source to provide power to the first and second DRAM banks and supplying the set of refresh signals from the refresh generator to the refresh input for each bank thereby maintaining the contents of the first and second DRAM banks.

15. The cache memory system of claim 14 wherein the failure of the external cache controller is determined based on a voltage level of power received from the computer system for powering the cache memory system.

16. The cache memory system of claim 14 wherein the integrated module is a SIMM.

* * * * *